Edward A. White, Jr.
Rodney E. Grantham
INVENTORS.

BY ATTORNEY.

AGENT.

United States Patent Office 3,211,057
Patented Oct. 12, 1965

3,211,057
MAGNETIC LOW FREQUENCY BAND
PASS FILTER
Edward A. White, Jr., Silver Spring, and Rodney E. Grantham, Bethesda, Md., assignors to the United States of America as represented by the Secretary of the Navy
Filed Feb. 28, 1964, Ser. No. 348,912
1 Claim. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates to a low frequency band pass filter, and more particularly to a communication system for transmitting intelligence by directiong low frequency magnetic energy through a radio frequency shield.

Present day aircraft having free-fall bombs attached thereto are subjected to much electromagnetic energy of high frequency, due to the extensive use of this energy for communication as well as in enemy jamming. The fuzing and arming systems of some of these free-fall bombs have electro-explosive devices, which are sensitive to portions of this energy, as evidenced by the fact that sometimes a bomb may explode for no apparent reason. One way to overcome this defect is to enclose the bomb in a radio frequency shield. This radio frequency (RF) shield prevents both electromagnetic energies as well as any other desired communications from entering the bomb. Whenever the RF shield is pierced, a way is open for the stray RF energy to enter. If wires are used for communication between the aircraft and the bomb these act as antenna to gather and direct the stray RF energy into the bomb. The problem then exists as to how to maintain communication between the pilot in the aircraft and the bomb, while maintaining the integral RF shield around the bomb. The prior art devices have all utilized an opening through the RF shield.

The present invention solves the problem of communication between the pilot in the aircraft and the bomb while maintaining an integral RF shield around the bomb. The present invention utilizes a transformer core which is separated into two portions which are positioned in alignment on opposite sides of the RF shield. A low frequency oscillator or pulsed D.C. power source is connected to a primary winding, which when energized transmits pulse communication through the shield to a secondary winding on the other part of the transformer core. The secondary winding is connected to an electro-explosive device within the bomb. The RF shield thus acts as a shunt to high frequency electromagnetic energy, while the combination of the RF shield interposed portions of the transformer core acts as a low frequency band pass filter.

An object of the present invention is to provide pulse electronic communication between two points, one point being completely enclosed by a radio RF shield, the other point being external to said shield.

Another object is to provide a low frequency band pass filter which effectively shunts out all audio frequency and RF energy.

Other objects and features of the invention will become apparent from the following detailed description of the invention when considered in conjunction with the accompanying drawing wherein.

Figure 1:
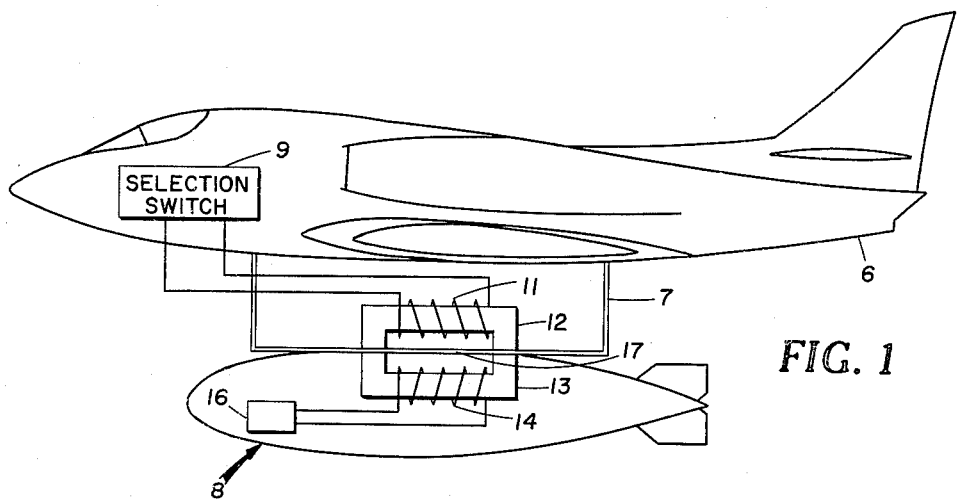
FIG. 1 is a side view schematically showing the band pass filter as utilized with a bomb and aircraft.

FIG. 1 illustrates an aircraft 6 having a bomb rack 7 attached thereto. Releasably attached to the bomb rack 7 is a free-fall bomb 8. Within the aircraft is a selection switch 9 which is utilized to selectively energize the primary winding 11 on one part of the transformer core 12. A second portion of transformer core 13 contains a secondary winding 14, which is electrically connected to an arming and fuzing device 16. Positioned between the two portions of the transformer core, 12 and 13, is a conductive skin or radio frequency shield 17, which either completely encloses the entire bomb or all of the elements sensitive to the radio frequency energy.

Figure 2:
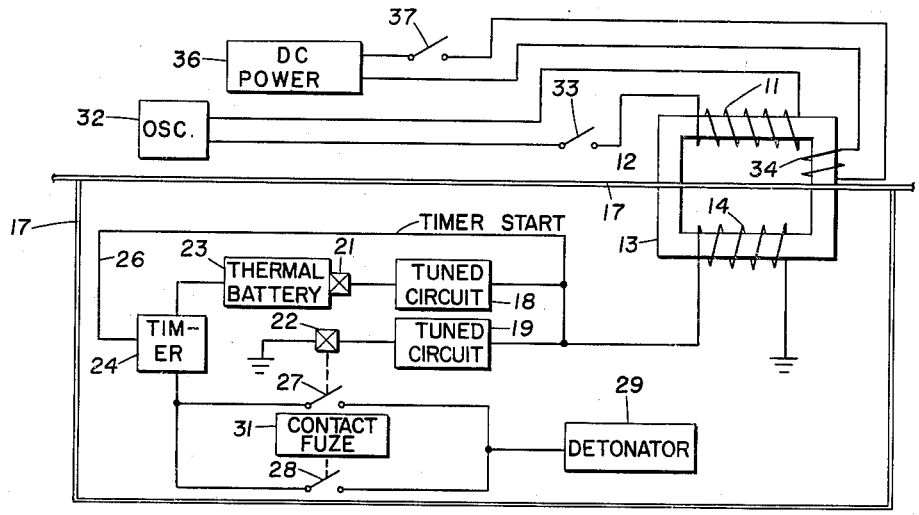
FIG. 2 is a schematic diagram of the elements of one embodiment of the invention.

Referring now to FIG. 2, wherein parts having the same function as those in FIG. 1 have the same reference numeral, there is shown the two portions of the transformer core, 12 and 13, the primary winding 11, secondary winding 14 and the radio frequency shield 17. Contained within the radio frequency shield and attached in an electrical circuit to the secondary winding are a pair of tuned circuits 18 and 19. Each tuned circuit is tuned to pass a different frequency pulse and the output of the tuned circuits lead to a pair of squibs 21 and 22. Squib 21 is connected to a thermal battery 23 which becomes active in response to the heating action of the squib 21. The thermal battery is electrically connected to a timer 34 which begins its timing action upon receipt of a high energy input pulse on conductor 26, as will be more fully explained hereinafter. The output of the timer 24 takes one of two parallel paths through switches 27 or 28 to a detonator 29. Detonator 29 may be any of the well known electro-explosive devices, sometimes called electric matches, or any other detonator, which is capable of initiating detonation of the main warhead (not shown). Connected to switch 28 is a contact fuze 31 which closes the switch 28 upon contact of the bomb with any object. Switch 27 is connected to squib 22 to allow detonation of the warhead in flight before contact of the bomb with an object. Whether the detonation be in flight or upon contact, the timer 24 controls the detonation.

Connected to the primary winding 11 is an oscillator 32 of variable frequency, which is used to selectively and intermittently energize primary winding through the closing of the switch 33. Another winding 34 is connected to the one portion of transformer core 12. This winding is connected in series with a D.C. power source 26 and a switch 37. The D.C. power source energizes winding 34 which maintains a constant flux through the core portions 12 and 13. Upon mechanical release of the bomb from the aircraft the two portions of the transformer core, 12 and 13, are physically separated from each other and the sudden change in the flux density creates a high energy output pulse upon secondary winding 14. This high energy output pulse is utilized to initiate the timing action of the timer by directing the high energy pulse through conductor 26 to the timer 24.

The RF shield 17 is made of material, such as copper, having high conductivity for electrical currents and low permeability for magnetic energy. In a well known manner this shield prevents the transmission of radio frequency energy through it and effectively creates a region free of electro-magnetic radiation when the shield forms a closed container. The two portions of the core, 12 and 13, are positioned on opposite sides of the RF shield 17 so that the RF shield is effectively a shunt for high frequency energy, according to skin depth theory, that is energy above 10 kc. Energy below 10 kc. will not penetrate the RF shield 17, unless it emanates from the primary winding 11 on one portion of the core 12 and is both received by the second portion of the core 13 and is detected by the secondary winding 14. This is to say that the longitudinal axis of the two cores are in alignment on both sides of the magnetic shield, and this axis is perpendicular to the axis of the RF shield.

Thus, in operation, the pilot can select a frequency which corresponds to a frequency of one of the tuned circuits and by closing the switch 33 he can transmit a pulse of information from the primary winding 11 to one of the squibs 21 or 22. The frequency of the oscillator can vary from 10 kc. down to and including a pulsed D.C. output or a step function output.

As an example, assume that it is desired to release a bomb and to arm and fuze it while in flight. The pilot then would select the proper frequency for the tuned circuit 19 and close the switch 33. This would case a pulse to appear on the secondary winding to be passed by a tuned circuit 19 and activate the squib 22. This would close the switch 27 connecting the timer 24 to the detonator 29. The pilot then would change the frequency of the oscillator 32 to a frequency proportional to that of the tuned circuit 18 and again open and close the switch 33 to cause a pulse of information to appear on the secondary winding 14. In a similar manner, this pulse would be passed by the tuned circuit 18 to squib 21 to activate the thermal battery 23 to apply electrical energy to the timer 24. The switch 37, which connects to the D.C. power source 36 to winding 34, would then be closed to produce a constant flux in one direction in the transformer core, 12 and 13. With the switch 37 closed and the actual mecahnical release of the bomb from the aircraft, a high energy output is produced on secondary winding 14, which would initiate the timer by a pulse on conductor 26. After a predetermined time, the timer 24 would close an electrical circuit from the thermal battery 23 to the detonator 29 thereby causing initiation of the detonator 29. If it is desired that the detonator ignite upon contact with an object then the switch 27 would be left open and the switch 28 would closed by the contact fuze 31.

Figure 3:
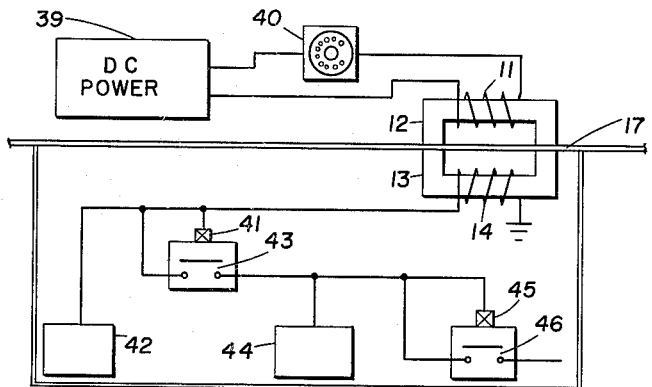
FIG. 3 is a schematic diagram of the elements of another embodiment of the invention.

FIG. 3 illustrates another embodiment of the invention wherein a D.C. power source 39 is connected in a series electric circuit with primary 11 and dial selector switch 40. The selector switch is of the type normally found on telephones and which sequentially closes and opens a circuit in a accordance with the particular function dialed. This sequential closing of an electric switch would energize primary winding 11 with a series of D.C. or step function pulses. As described hereinbefore, the secondary winding 14 generates similar output pulses as those used to energize the primary winding. The secondary winding in connected electrically to a squib 41 and load 42. Thus, the first pulse would energize squib 41 and also arrive at load 42, which may be a contact fuze or any other type of load. Activation of squib 41 closes switch 43 and allows the second pulse to be received by loads 42 and 44 and also activate squib 45 to close switch 46. Load 44 could be a time type fuze. The number of loads can be extended, and the type of loads may be changed in a similar manner as described for loads 42 and 44.

In summary therefore, the RF shield provides a complete and uninterrupted cover or shield for electro-magnetic radiation. The positioning of the portions of the transformer core on opposite sides of the RF shield do not pierce or interfere with the RF shield, but allow communication between a point external of the RF shield and a point internal of the RF shield. It has been found by experiment that the frequency of the filter varies with the thickness of the RF shield. It has been found that a skin thickness of .020 inch produces an effective low frequency band pass filter for frequencies under 10 kc. It has also been determined that as the thickness of the shield increases the transmitted energy decerases and the upper limit of the band pass filter decreases in frequency. Acceptable limits to the thickness of the RF shield is between 0.010 and 0.200 inch.

It should be understood of course that the foregoing disclosure relates to only a preferred embodiment of the invention and that numerous modifications or alterations may be made therein without departing from the spirit and scope of the invention as set forth in the independent claim.

What is claimed is:

A frequency selector arming system comprising:
a bomb having a detonator for initiating detonation,
a secondary winding,
a timer controlled switch connected between said detonator and said secondary winding,
at least one tuned circuit having two terminals, one terminal being connected to said secondary winding,
a squib activated battery having the squib connected to the other terminal of said tuned circuit and the battery connected to said timer,
an RF shield means enclosing said detonator, said timer, said tuned circuit, said battery and said secondary winding forming a first portion of a transformer for blocking all electro-magnetic energy above 10 kc.,
and a second portion of a transformer core inductively connected to said secondary winding and in physical contact and enclosed within said radio frequency shield,
a third portion of a transformer core in physical contact with said shield means and in magnetic and axial alignment with said second portion,
a primary winding inductively coupled to said third portion of the transformer,
and a D.C. and an A.C. power source connected to said primary winding,
whereby said RF shield excludes all stray electro-magnetic energy while maintaining communication between said A.C. power source and said tuned circuit and also between said D.C. power source and the timer.

References Cited by the Examiner

UNITED STATES PATENTS

| | | | |
|---|---|---|---|
| 3,039,042 | 6/62 | Chatterton | 336—84 X |
| 3,063,345 | 11/62 | Harmon et al. | 102—70.2 X |
| 3,148,619 | 9/64 | Holinbeck | 102—70.2 X |

BENJAMIN A. BORCHELT, *Primary Examiner.*

SAMUEL W. ENGLE, *Examiner.*